United States Patent
Khlat (10) Patent No.: US 8,369,250 B1
(45) Date of Patent: Feb. 5, 2013

(54) MULTI-MODE SPLIT BAND DUPLEXER ARCHITECTURE

(75) Inventor: Nadim Khlat, Cugnaux (FR)

(73) Assignee: RF Micro Devices, Inc., Greensboro, NC (US)

( * ) Notice: Subject to any disclaimer, the term of this patent is extended or adjusted under 35 U.S.C. 154(b) by 303 days.

(21) Appl. No.: 12/899,632

(22) Filed: Oct. 7, 2010

Related U.S. Application Data (60) Provisional application No. 61/249,458, filed on Oct. 7, 2009.

(51) Int. Cl.
H04B 1/56 (2006.01)
H04L 5/14 (2006.01)
(52) U.S. Cl. ........................................ 370/280; 370/330
(58) Field of Classification Search .................. 370/280, 370/281, 330, 478
See application file for complete search history.

(56) References Cited

U.S. PATENT DOCUMENTS

| | | | | |
|---|---|---|---|---|
| 2002/0176375 A1* | 11/2002 | Barabash et al. | ............ | 370/277 |
| 2006/0276158 A1* | 12/2006 | Okabe | ........................... | 455/333 |
| 2009/0068963 A1* | 3/2009 | Cabanillas et al. | ............. | 455/83 |
| 2009/0275357 A1* | 11/2009 | Nakamura et al. | ......... | 455/550.1 |
| 2009/0296609 A1* | 12/2009 | Choi et al. | .................... | 370/281 |

* cited by examiner

Primary Examiner — Brian D Nguyen
(74) Attorney, Agent, or Firm — Withrow & Terranova, P.L.L.C.

(57) ABSTRACT

The present disclosure relates to a split-band duplexer architecture that takes advantage of a relationship between a frequency division duplex (FDD) transmit band, an FDD receive band, and a time division duplex (TDD) band, which has frequencies located between FDD transmit band frequencies and FDD receive band frequencies. As such, by splitting the FDD receive and transmit bands into two sub-bands, two separate sub-band duplexers may be used to fully support the FDD receive and transmit bands. Further, a passband of one of the sub-band duplexers may be widened to support the TDD band while transmitting, and a passband of the other of the sub-band duplexers may be widened to support the TDD band while receiving. By using sub-band duplexers, isolation margins and insertion loss margins may be increased, which may allow use of standard filter components, such as surface acoustic wave (SAW) filters.

20 Claims, 10 Drawing Sheets

MULTI-MODE SPLIT BAND DUPLEXER ARCHITECTURE

This application claims the benefit of provisional patent application Ser. No. 61/249,458, filed Oct. 7, 2009, the disclosure of which is hereby incorporated herein by reference in its entirety and is included in Appendix 1.

FIELD OF THE INVENTION

The present invention relates to radio frequency (RF) duplexers, which may be used in RF communications circuitry.

BACKGROUND OF THE INVENTION

RF communications systems typically communicate using at least one of three different modes of operation. The first mode, called simplex, is a one-way mode of operation, in which a transmitter from one location transmits data to a receiver at another location. For example, a broadcast radio station transmits data one-way to radios. The second mode, called half duplex, is a two-way mode of operation, in which a first transceiver communicates with a second transceiver; however, only one transceiver transmits at a time. Therefore, the transmitter and receiver in a transceiver do not operate simultaneously. For example, certain telemetry systems operate in a send-then-wait-for-reply manner. The third mode, called full duplex, is a simultaneous two-way mode of operation, in which a first transceiver communicates with a second transceiver, and both transceivers may transmit simultaneously; therefore, the transmitter and receiver in a transceiver must be capable of operating simultaneously. In a full duplex transceiver, signals from the transmitter must not interfere with signals received by the receiver; therefore, transmitted signals are at transmit frequencies that are different from received signals, which are at receive frequencies. The difference between a transmit frequency and a receive frequency is called the duplex frequency. For example, certain cellular telephone systems operate using a full duplex mode of operation.

Full duplex transceivers using a single antenna often use a duplexer to couple the transmitter and receiver to the single antenna. A duplexer enables simultaneous transmission and reception of RF signals by providing a transmit passband that does not overlap with a receive passband, which prevents interference between transmit and receive signals. The non-overlapping area is also known as a duplex gap. Some communications protocols, such as specific Universal Mobile Telecommunications System (UMTS) bands have duplex gaps that are narrow relative to the transmit and receive passbands; therefore, providing the required transmit and receive passbands with minimal insertion loss while providing required isolation between transmit and receive signals may be difficult.

Additionally, as wireless communications technologies evolve, wireless communications systems become increasingly sophisticated. As a result, multi-mode and multi-band wireless systems are becoming routinely available. Such systems may include common circuit elements to support multiple modes, multiple bands, or both to reduce size, cost, and insertion losses. Thus, there is a need for a multi-mode duplexer architecture that supports multi-mode functionality, simplifies front-end architectures, and provides required transmit and receive passbands with minimal insertion loss while providing required isolation between transmit and receive signals.

SUMMARY OF THE INVENTION

The present disclosure relates to a split-band duplexer architecture that takes advantage of a relationship between a frequency division duplex (FDD) transmit band, an FDD receive band, and a time division duplex (TDD) band, which has frequencies located between FDD transmit band frequencies and FDD receive band frequencies. As such, by splitting the FDD receive and transmit bands into two sub-bands, two separate sub-band duplexers may be used to fully support the FDD receive and transmit bands. Further, a passband of one of the sub-band duplexers may be widened to support the TDD band while transmitting, and a passband of the other of the sub-band duplexers may be widened to support the TDD band while receiving. By using sub-band duplexers, isolation margins and insertion loss margins may be increased, which may allow use of standard filter components, such as surface acoustic wave (SAW) filters, and their accompanying manufacturing tolerances and drift characteristics.

Those skilled in the art will appreciate the scope of the present invention and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the invention, and together with the description serve to explain the principles of the invention.

DETAILED DESCRIPTION OF THE PREFERRED EMBODIMENTS

The embodiments set forth below represent the necessary information to enable those skilled in the art to practice the invention and illustrate the best mode of practicing the invention. Upon reading the following description in light of the accompanying drawing figures, those skilled in the art will understand the concepts of the invention and will recognize applications of these concepts not particularly addressed herein. It should be understood that these concepts and applications fall within the scope of the disclosure and the accompanying claims.

Figure 1:
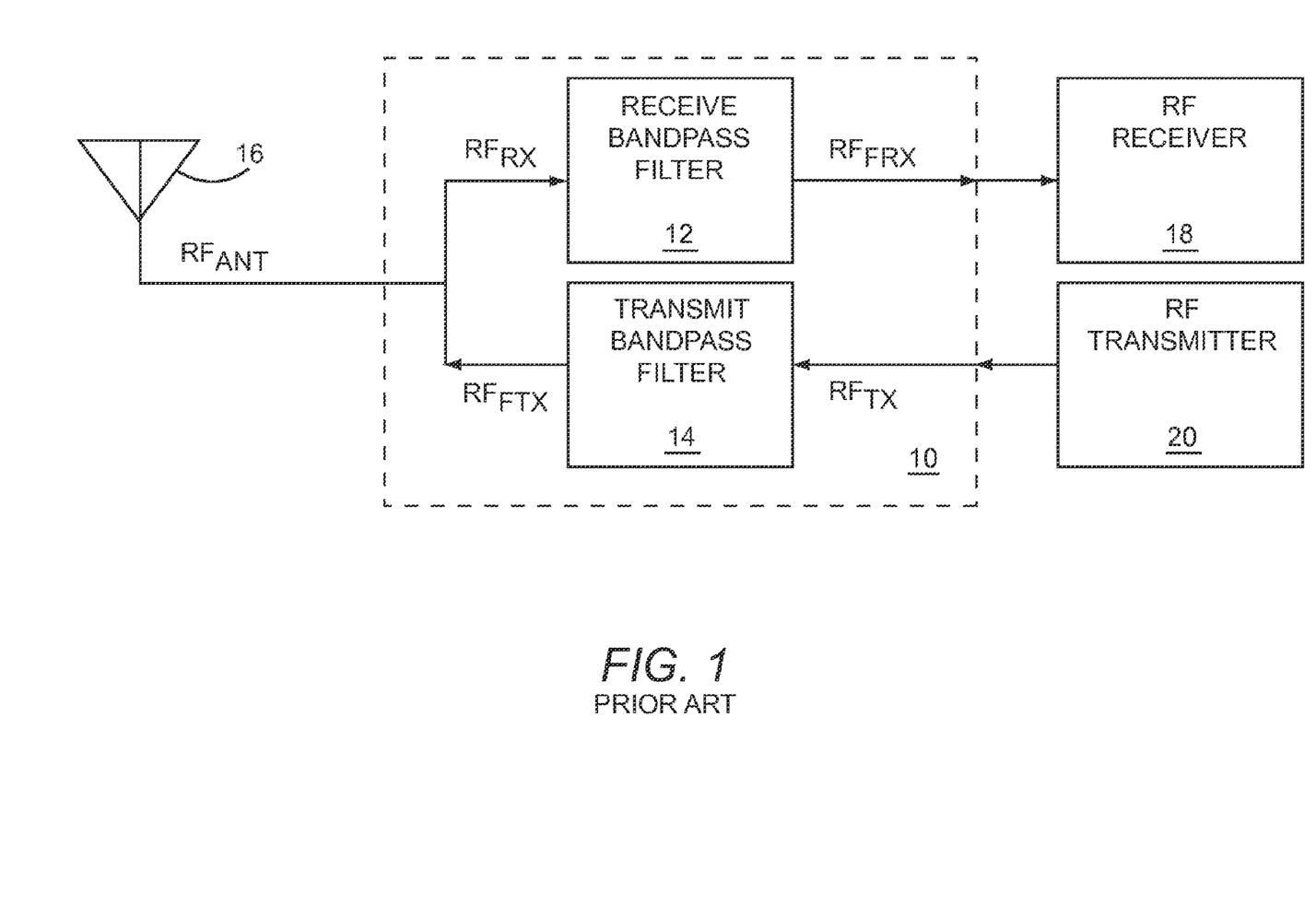
FIG. 1 shows an RF duplexer according to the prior art.

FIG. 1 shows an RF duplexer 10 according to the prior art. The RF duplexer 10 includes a receive bandpass filter 12 and a transmit bandpass filter 14, which are both coupled to an antenna 16. The antenna 16 has an antenna signal $RF_{ANT}$, which provides a receive signal $RF_{RX}$ to the receive bandpass filter 12, and receives a filtered transmit signal $RF_{FTX}$ from the transmit bandpass filter 14. The receive bandpass filter 12 provides a filtered receive signal $RF_{FRX}$ to an RF receiver 18, and the transmit bandpass filter 14 receives a transmit signal $RF_{TX}$ from an RF transmitter 20. Normally, the passband of the receive bandpass filter 12 does not overlap the passband of the transmit bandpass filter 14 to prevent noise from the transmit signal path or transmit signals from interfering with receiver operation.

Figure 2A:
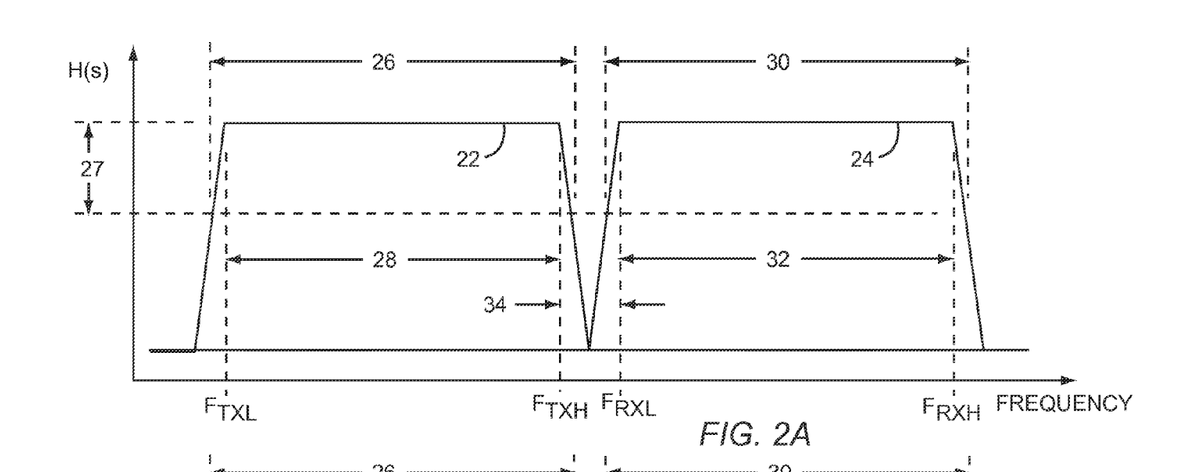
FIGS. 2A and 2B are graphs comparing ideal transmit and receive bandpass filter response curves for an RF duplexer with a downward shifted transmit bandpass filter response curve.
Figure 2B:
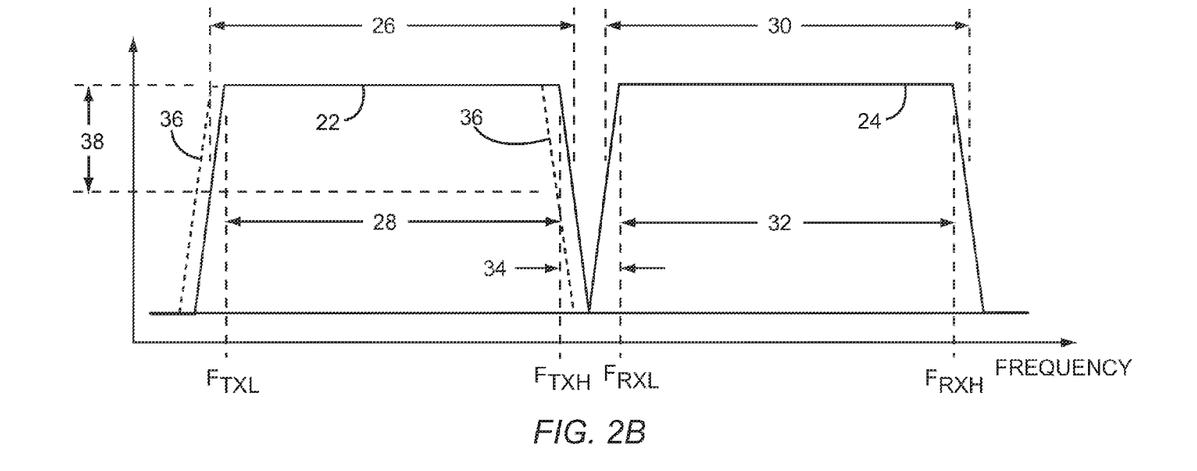

FIG. 2A is a graph showing ideal transmit and receive bandpass filter response curves 22, 24 for an RF duplexer. The ideal transmit and receive bandpass filter response curves 22, 24 show the ideal transfer functions H(s) of the receive and transmit bandpass filters 12, 14 as a function of frequency. The ideal transmit bandpass filter response curve 22 has a full transmit bandpass filter bandwidth 26, which is measured at a filter breakpoint 27 below the maximum of the response curve 22. A full transmit passband 28 spans the transmit frequency ranges used by the RF duplexer 10. The ideal receive bandpass filter response curve 24 includes a full receive bandpass filter bandwidth 30, which is measured at the filter breakpoint 27 below the maximum of the response curve 24. A full receive passband 32 spans the receive frequency ranges used by the RF duplexer 10. A duplex gap 34 separates the full transmit passband 28 from the full receive passband 32, and provides isolation between transmit signals and RF signals. A lowest transmit passband frequency $F_{TXL}$ is at the bottom of the full transmit passband 28, and a highest transmit passband frequency $F_{TXH}$ is at the top of the full transmit passband 28. A lowest receive passband frequency $F_{RXL}$ is at the bottom of the full receive passband 32, and a highest receive passband frequency $F_{RXH}$ is at the top of the full receive passband 32. If the duplex gap 34 is small, then practical receive and transmit bandpass filters 12, 14 may vary from ideal bandpass filter responses sufficiently to impact filter operation. Such variances may be caused by multiple factors, including manufacturing tolerances, temperature drift, aging, other factors, or any combination thereof. FIG. 2B is a graph showing a downward shifted transmit bandpass filter response curve 36, which may be caused by any of the multiple factors listed above. At the highest transmit passband frequency $F_{TXH}$, the transmit bandpass filter 14 introduces additional insertion loss 38 into the transmit path, which may reduce output power, transmitter efficiency, or both.

Figure 3A:
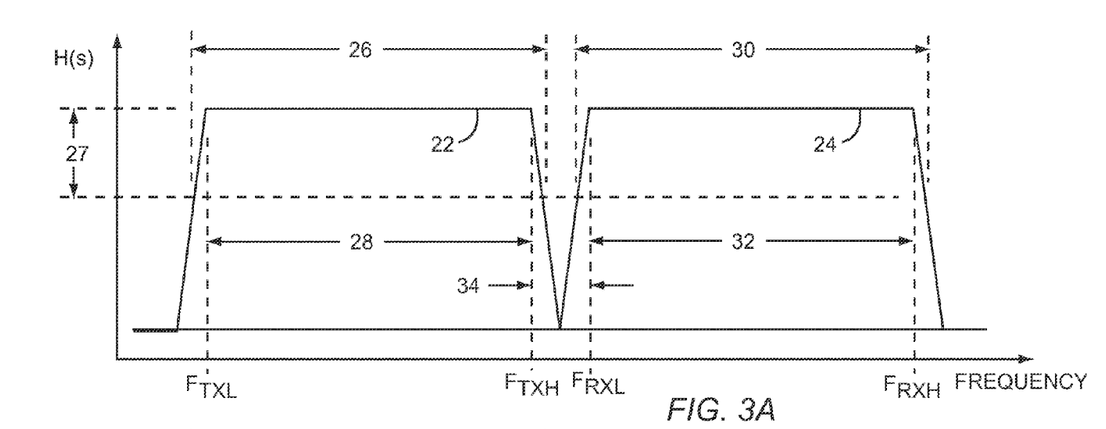
FIGS. 3A and 3B are graphs comparing the ideal transmit and receive bandpass filter response curves for an RF duplexer with an upward shifted transmit bandpass filter response curve.
Figure 3B:
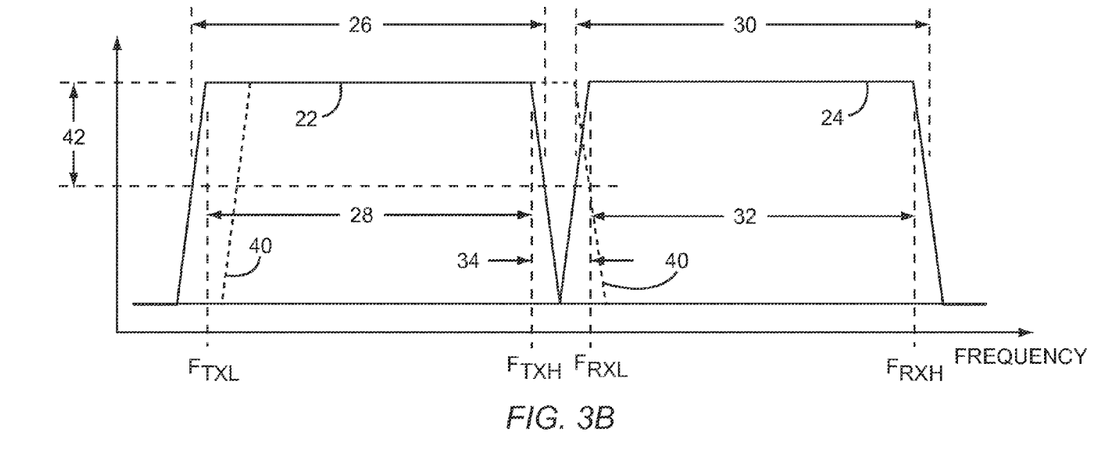

FIG. 3A is a graph showing the ideal transmit and receive bandpass filter response curves 22, 24 for an RF duplexer as illustrated in FIG. 2A. FIG. 3B is a graph showing an upward shifted transmit bandpass filter response curve 40, which may be caused by manufacturing tolerances, temperature drift, aging, other factors, or any combination thereof. At the lowest receive passband frequency $F_{RXL}$, the transmit bandpass filter 14 has degraded transmit isolation 42, which may allow transmit noise to enter the receive path and desensitize the receiver.

Figure 4A:
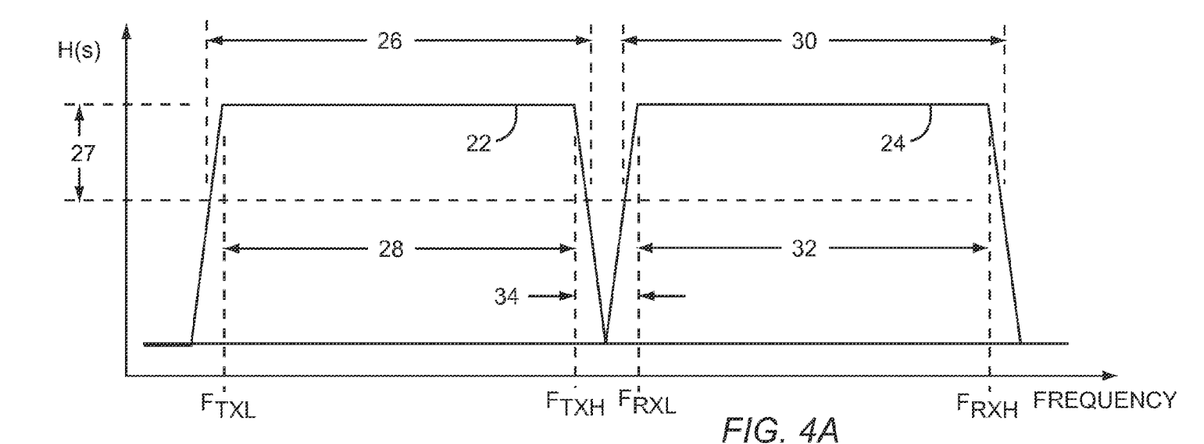
FIGS. 4A and 4B are graphs comparing the ideal transmit and receive bandpass filter response curves for an RF duplexer with an upward shifted receive bandpass filter response curve.
Figure 4B:
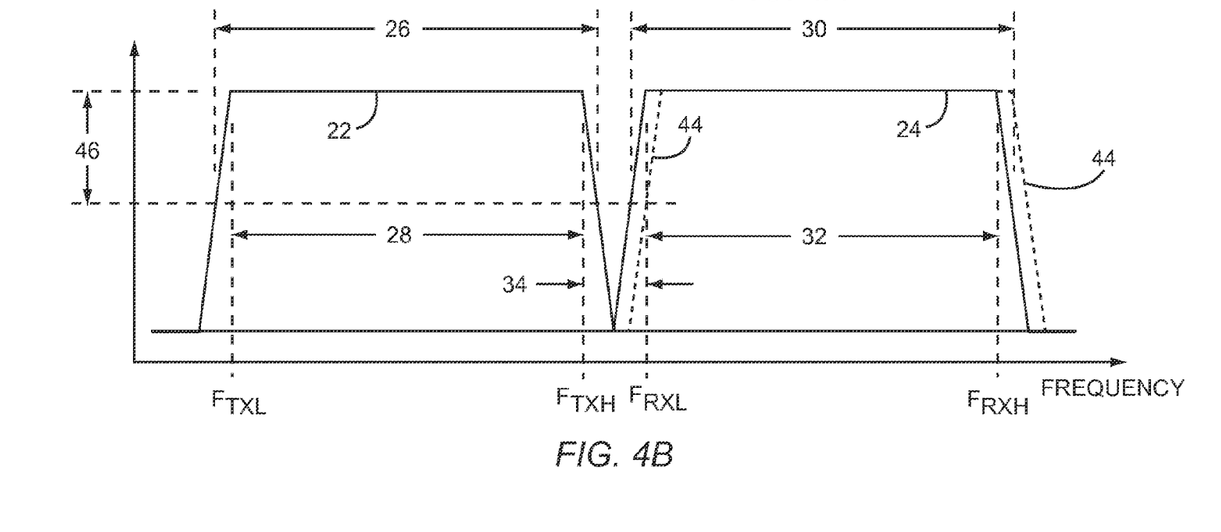

FIG. 4A is a graph showing the ideal transmit and receive bandpass filter response curves 22, 24 for an RF duplexer as illustrated in FIG. 2A. FIG. 4B is a graph showing an upward shifted receive bandpass filter response curve 44, which may be caused by manufacturing tolerances, temperature drift, aging, other factors, or any combination thereof. At the lowest receive passband frequency $F_{RXL}$, the receive bandpass filter 12 suffers additional insertion loss 46, which may degrade receiver sensitivity.

The present disclosure relates to a split-band duplexer architecture that takes advantage of a relationship between a frequency division duplex (FDD) transmit band, an FDD receive band, and a time division duplex (TDD) band, which has frequencies located between FDD transmit band frequencies and FDD receive band frequencies. As such, by splitting the FDD receive and transmit bands into two sub-bands, two separate sub-band duplexers may be used to fully support the FDD receive and transmit bands. Further, a passband of one of the sub-band duplexers may be widened to support the TDD band while transmitting, and a passband of the other of the sub-band duplexers may be widened to support the TDD band while receiving. By using sub-band duplexers, isolation margins and insertion loss margins may be increased, which may allow use of standard filter components, such as surface acoustic wave (SAW) filters, and their accompanying manufacturing tolerances and drift characteristics.

Figure 5A:
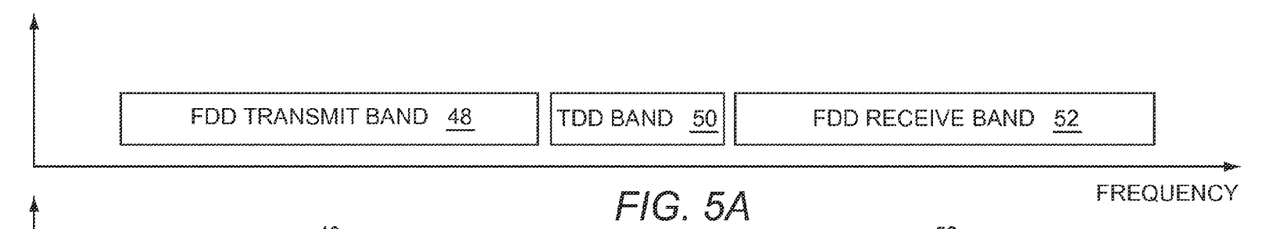
FIG. 5A is a graph showing a frequency distribution of a frequency division duplex (FDD) transmit band, a time division duplex (TDD) band, and an FDD receive band that are associated with RF circuitry according to one embodiment of the FDD transmit band, the TDD band, and the FDD receive band.

FIG. 5A is a graph showing a frequency distribution of an FDD transmit band 48, a TDD band 50, and an FDD receive band 52 that are associated with RF circuitry 62 (FIG. 6) according to one embodiment of the FDD transmit band 48, the TDD band 50, and the FDD receive band 52. In different operating modes the RF circuitry 62 may transmit RF signals in the FDD transmit band 48, in the TDD band 50, or both, and the RF circuitry 62 may receive RF signals in the FDD receive band 52, in the TDD band 50, or both, according to one embodiment of the RF circuitry 62. As illustrated, frequencies in the FDD transmit band 48 are less than frequencies in the FDD receive band 52. Further, frequencies in the TDD band 50 are between the frequencies in the FDD transmit band 48 and the frequencies in the FDD receive band 52.

Figure 5B:
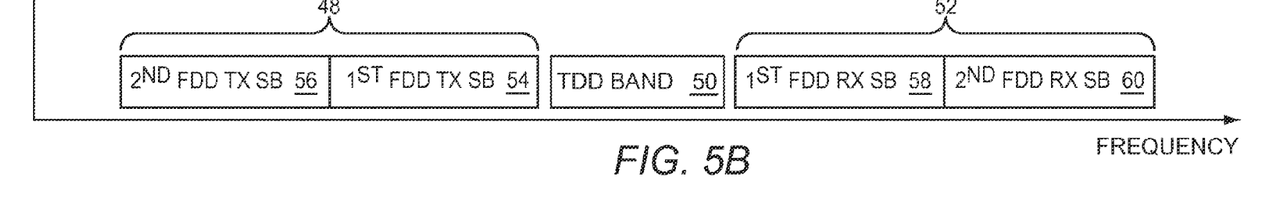
FIG. 5B is a graph showing details of the FDD transmit band, the TDD band, and the FDD receive band illustrated in FIG. 5A according to an exemplary embodiment of the FDD transmit band, the TDD band 50, and the FDD receive band.

FIG. 5B is a graph showing details of the FDD transmit band 48 and the FDD receive band 52 illustrated in FIG. 5A according to an exemplary embodiment of the FDD transmit band 48 and the FDD receive band 52. The FDD transmit band 48 includes a first FDD transmit sub-band 54 and a second FDD transmit sub-band 56. The FDD receive band 52 includes a first FDD receive sub-band 58 and a second FDD receive sub-band 60. Frequencies in the first FDD transmit sub-band 54 may be between frequencies in the second FDD transmit sub-band 56 and the frequencies in the TDD band 50. Frequencies in the first FDD receive sub-band 58 may be between frequencies in the second FDD receive sub-band 60 and the frequencies in the TDD band 50. A bandwidth of the first FDD transmit sub-band 54 may be about equal to a bandwidth of the second FDD transmit sub-band 56. A bandwidth of the first FDD receive sub-band 58 may be about equal to a bandwidth of the second FDD receive sub-band 60.

Figure 5C:
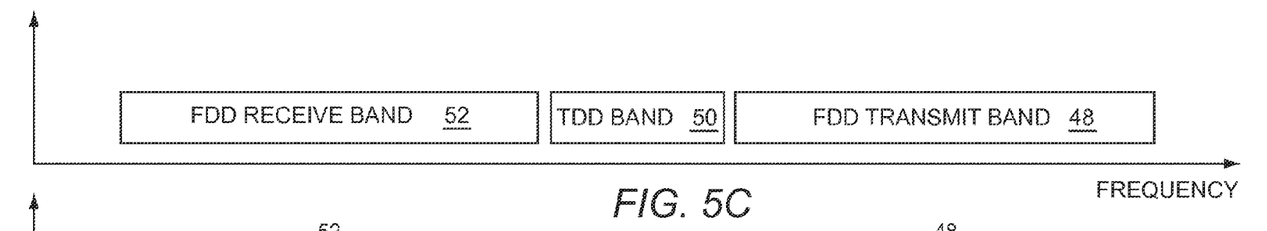
FIG. 5C is a graph showing a frequency distribution of the FDD transmit band, the TDD band, and the FDD receive band that are associated with the RF circuitry according to an alternate embodiment of the FDD transmit band, the TDD band, and the FDD receive band.

FIG. 5C is a graph showing a frequency distribution of the FDD transmit band 48, the TDD band 50, and the FDD receive band 52 that are associated with the RF circuitry 62 (FIG. 6) according to an alternate embodiment of the FDD transmit band 48, the TDD band 50, and the FDD receive band 52. In different operating modes the RF circuitry 62 may transmit RF signals in the FDD transmit band 48, in the TDD band 50, or both, and the RF circuitry 62 may receive RF signals in the FDD receive band 52, in the TDD band 50, or both, according to one embodiment of the RF circuitry 62. As illustrated, frequencies in the FDD transmit band 48 are greater than frequencies in the FDD receive band 52. Further, frequencies in the TDD band 50 are between the frequencies in the FDD transmit band 48 and the frequencies in the FDD receive band 52.

Figure 5D:
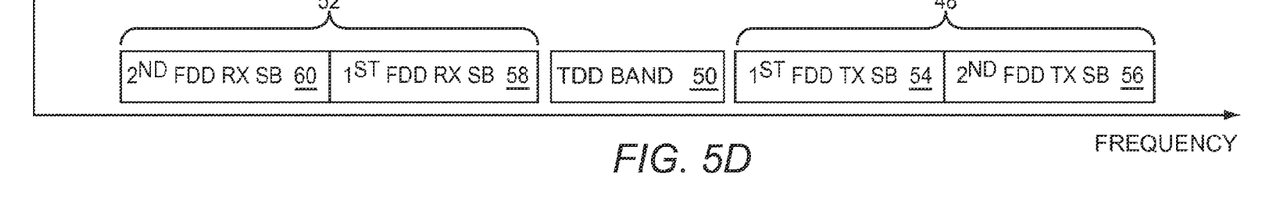
FIG. 5D is a graph showing details of the FDD transmit band, the TDD band, and the FDD receive band illustrated in FIG. 5C according to an exemplary embodiment of the FDD transmit band, the TDD band, and the FDD receive band.

FIG. 5D is a graph showing details of the FDD transmit band 48, the TDD band 50, and the FDD receive band 52 illustrated in FIG. 5C according to an exemplary embodiment of the FDD transmit band 48, the TDD band 50, and the FDD receive band 52. The FDD transmit band 48 includes the first FDD transmit sub-band 54 and the second FDD transmit sub-band 56. The FDD receive band 52 includes the first FDD receive sub-band 58 and the second FDD receive sub-band 60. Frequencies in the first FDD transmit sub-band 54 may be between frequencies in the second FDD transmit sub-band 56 and the frequencies in the TDD band 50. Frequencies in the first FDD receive sub-band 58 may be between frequencies in the second FDD receive sub-band 60 and the frequencies in the TDD band 50. A bandwidth of the first FDD transmit sub-band 54 may be about equal to a bandwidth of the second FDD transmit sub-band 56. A bandwidth of the first FDD receive sub-band 58 may be about equal to a bandwidth of the second FDD receive sub-band 60.

Figure 6:
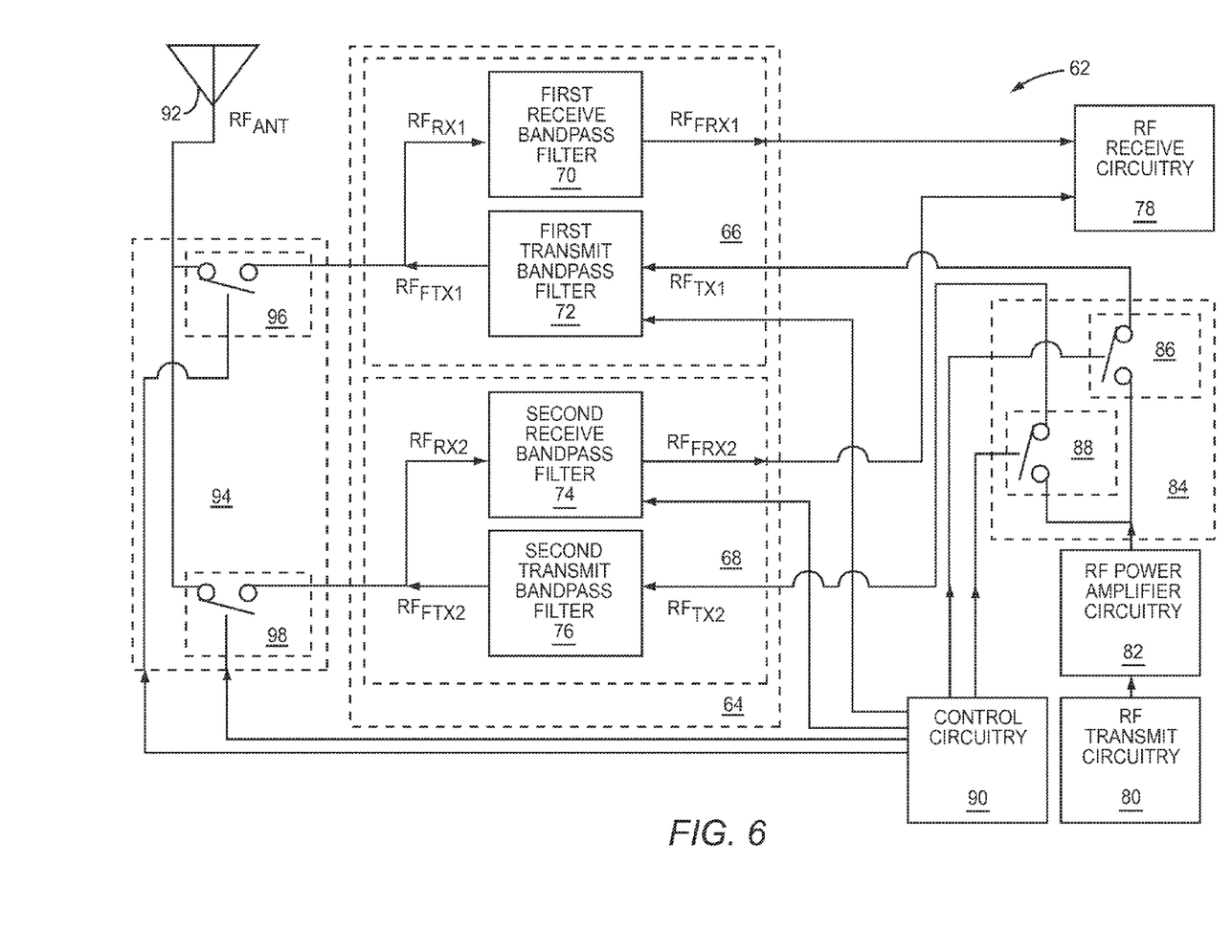
FIG. 6 shows the RF circuitry according to one embodiment of the RF circuitry.

FIG. 6 shows the RF circuitry 62 according to one embodiment of the RF circuitry 62. The RF circuitry 62 includes a split band duplexer 64, which includes a first sub-band duplexer 66 and a second sub-band duplexer 68. The first sub-band duplexer 66 includes a first receive bandpass filter 70 and a first transmit bandpass filter 72, and the second sub-band duplexer 68 includes a second receive bandpass filter 74 and a second transmit bandpass filter 76. Further, the RF circuitry 62 includes RF receive circuitry 78, RF transmit circuitry 80, RF power amplifier circuitry 82, and transmit switching circuitry 84, which includes a first transmit switch 86 and a second transmit switch 88. Additionally, the RF circuitry 62 includes control circuitry 90, an antenna 92, and antenna switching circuitry 94, which includes a first antenna switch 96 and a second antenna switch 98.

When operating, the control circuitry 90 selects one of a first FDD operating mode, a second FDD operating mode, and a TDD operating mode. The TDD operating mode may be a half-duplex operating mode, such that the RF circuitry 62 may transmit RF signals and may receive RF signals, but not simultaneously. The first and the second FDD operating modes may be full-duplex operating modes, such that the RF circuitry 62 may transmit RF signals and may receive RF signals simultaneously. During the second FDD operating mode, the first receive bandpass filter 70 receives and filters a first receive signal $RF_{RX1}$ to provide a first filtered receive signal $RF_{FRX1}$ to the RF receive circuitry 78 for further processing. During the first FDD operating mode, the second receive bandpass filter 74 receives and filters a second receive signal $RF_{RX2}$ to provide a second filtered receive signal $RF_{FRX2}$ to the RF receive circuitry 78 for further processing. Additionally, during the TDD operating mode while receiving, the second receive bandpass filter 74 receives and filters the second receive signal $RF_{RX2}$ to provide the second filtered receive signal $RF_{FRX2}$ to the RF receive circuitry 78 for further processing.

During the second FDD operating mode, the first transmit bandpass filter 72 receives and filters a first transmit signal $RF_{TX1}$ to provide a first filtered transmit signal $RF_{FTX1}$ to the first antenna switch 96. Further, during the TDD operating mode while transmitting, the first transmit bandpass filter 72 receives and filters a first transmit signal $RF_{TX1}$ to provide a first filtered transmit signal $RF_{FTX1}$ to the first antenna switch 96. During the first FDD operating mode, the second transmit bandpass filter 76 receives and filters a second transmit signal $RF_{TX2}$ to provide a second filtered transmit signal $RF_{FTX2}$ to the second antenna switch 98.

In general, during the second FDD operating mode, the first sub-band duplexer 66 receives and filters the first receive signal $RF_{RX1}$ to provide the first filtered receive signal $RF_{FRX1}$ to the RF receive circuitry 78 for further processing. As such, during the second FDD operating mode, the RF receive circuitry 78 receives the first filtered receive signal $RF_{FRX1}$. During the first FDD operating mode and during the TDD operating mode while receiving, the second sub-band duplexer 68 receives and filters the second receive signal $RF_{RX2}$ to provide the second filtered receive signal $RF_{FRX2}$ to the RF receive circuitry 78 for further processing. As such, during the first FDD operating mode and during the TDD operating mode while receiving, the RF receive circuitry 78 receives the second filtered receive signal $RF_{FRX2}$. During the second FDD operating mode and during the TDD operating mode while transmitting, the first sub-band duplexer 66 receives and filters the first transmit signal $RF_{TX1}$ to provide the first filtered transmit signal $RF_{FTX1}$ to the first antenna switch 96. During the first FDD operating mode, second sub-band duplexer 68 receives and filters the second transmit signal $RF_{TX2}$ to provide the second filtered transmit signal $RF_{FTX2}$ to the second antenna switch 98.

The antenna 92 is coupled to the first and second antenna switches 96, 98 and provides or receives an antenna signal $RF_{ANT}$ to or from the first and second antenna switches 96, 98, respectively. The first antenna switch 96 is coupled between the first receive bandpass filter 70 and the antenna 92, and the first antenna switch 96 is coupled between the first transmit bandpass filter 72 and the antenna 92. In general, the antenna switching circuitry 94 is coupled between the first receive bandpass filter 70 and the antenna 92, and the antenna switching circuitry 94 is coupled between the first transmit bandpass filter 72 and the antenna 92. The second antenna switch 98 is coupled between the second receive bandpass filter 74 and the antenna 92, and the second antenna switch 98 is coupled between the second transmit bandpass filter 76 and the antenna 92. In general, the antenna switching circuitry 94 is coupled between the second receive bandpass filter 74 and the antenna 92, and the antenna switching circuitry 94 is coupled between the second transmit bandpass filter 76 and the antenna 92.

The control circuitry 90 is coupled to and selects either an OPEN state or a CLOSED state of the first antenna switch 96 and is coupled to and selects either an OPEN state or a CLOSED state of the second antenna switch 98. During the TDD operating mode while transmitting and during the second FDD operating mode, the first antenna switch 96 is in the CLOSED state and the second antenna switch 98 is in the OPEN state, such that the antenna switching circuitry 94 electrically couples the first transmit bandpass filter 72 to the antenna 92, the antenna switching circuitry 94 electrically couples the first receive bandpass filter 70 to the antenna 92, the antenna switching circuitry 94 electrically isolates the second transmit bandpass filter 76 from the antenna 92, and the antenna switching circuitry 94 electrically isolates the second receive bandpass filter 74 from the antenna 92. As such, during the TDD operating mode while transmitting, the first filtered transmit signal $RF_{FTX1}$ may provide the antenna signal $RF_{ANT}$, and during the second FDD operating mode, the antenna signal $RF_{ANT}$ may provide the first receive signal $RF_{RX1}$ and the first filtered transmit signal $RF_{FTX1}$ may provide part of the antenna signal $RF_{ANT}$.

During the TDD operating mode while receiving and during the first FDD operating mode, the first antenna switch 96 is in the OPEN state and the second antenna switch 98 is in the CLOSED state, such that the antenna switching circuitry 94 electrically isolates the first transmit bandpass filter 72 from the antenna 92, the antenna switching circuitry 94 electrically isolates the first receive bandpass filter 70 from the antenna 92, the antenna switching circuitry 94 electrically couples the second transmit bandpass filter 76 to the antenna 92, and the antenna switching circuitry 94 electrically couples the second receive bandpass filter 74 to the antenna 92. As such, during the TDD operating mode while receiving, the antenna signal $RF_{ANT}$ may provide the second receive signal $RF_{RX2}$, and during the first FDD operating mode, the antenna signal $RF_{ANT}$ may provide the second receive signal $RF_{RX2}$ and the second filtered transmit signal $RF_{FTX2}$ may provide part of the antenna signal $RF_{ANT}$.

The RF transmit circuitry 80 feeds the RF power amplifier circuitry 82, which receives and amplifies RF signals from the RF transmit circuitry 80 to provide RF transmit signals to the first transmit bandpass filter 72 or to the second transmit bandpass filter 76. Specifically, the first transmit switch 86 is coupled between the RF power amplifier circuitry 82 and the first transmit bandpass filter 72, and the second transmit switch 88 is coupled between the RF power amplifier circuitry 82 and the second transmit bandpass filter 76. In general, the transmit switching circuitry 84 is coupled between the RF power amplifier circuitry 82 and the first transmit bandpass filter 72 and the transmit switching circuitry 84 is coupled between the RF power amplifier circuitry 82 and the second transmit bandpass filter 76.

The control circuitry 90 is coupled to and selects either an OPEN state or a CLOSED state of the first transmit switch 86 and is coupled to and selects either an OPEN state or a CLOSED state of the second transmit switch 88. During the TDD operating mode while transmitting and during the second FDD operating mode, the first transmit switch 86 is in the CLOSED state and the second transmit switch 88 is in the OPEN state, such that the transmit switching circuitry 84 electrically couples the first transmit bandpass filter 72 to the RF power amplifier circuitry 82 and the transmit switching circuitry 84 electrically isolates the second transmit bandpass filter 76 from the RF power amplifier circuitry 82. As such, during the TDD operating mode while transmitting, the RF power amplifier circuitry 82 may provide the first transmit signal $RF_{TX1}$, and during the second FDD operating mode, the RF power amplifier circuitry 82 may provide the first transmit signal $RF_{TX1}$.

During first FDD operating mode, the first transmit switch 86 is in the OPEN state and the second transmit switch 88 is in the CLOSED state, such that the transmit switching circuitry 84 electrically isolates the first transmit bandpass filter 72 from the RF power amplifier circuitry 82 and the transmit switching circuitry 84 electrically couples the second transmit bandpass filter 76 to the RF power amplifier circuitry 82. As such, during the first FDD operating mode, the RF power amplifier circuitry 82 may provide the second transmit signal $RF_{TX2}$.

The first antenna switch 96, the second antenna switch 98, or both may include at least one Micro-Electro-Mechanical Systems (MEMS) switch. In general, the antenna switching circuitry 94 may include at least one MEMS switch to provide good RF isolation. Further, the first transmit switch 86, the second transmit switch 88, or both may include at least one MEMS switch. In general, the transmit switching circuitry 84 may include at least one MEMS switch for isolation.

At least one of the first receive bandpass filter 70, the first transmit bandpass filter 72, the second receive bandpass filter 74, and the second transmit bandpass filter 76 may include at least one surface acoustic wave (SAW) filter. In one embodiment of the first transmit bandpass filter 72 and the second receive bandpass filter 74, passbands of the first transmit bandpass filter 72, the second receive bandpass filter 74, or both are tunable. As such, the control circuitry 90 may be coupled to the first transmit bandpass filter 72, the second receive bandpass filter 74, or both to select at least one of the passbands. In alternate embodiments of the RF circuitry 62, the RF circuitry 62 may not provide any or all of the RF receive circuitry 78, the RF transmit circuitry 80, the RF power amplifier circuitry 82, the transmit switching circuitry 84, the antenna 92, and the antenna switching circuitry 94.

Figures 7A, 7B:
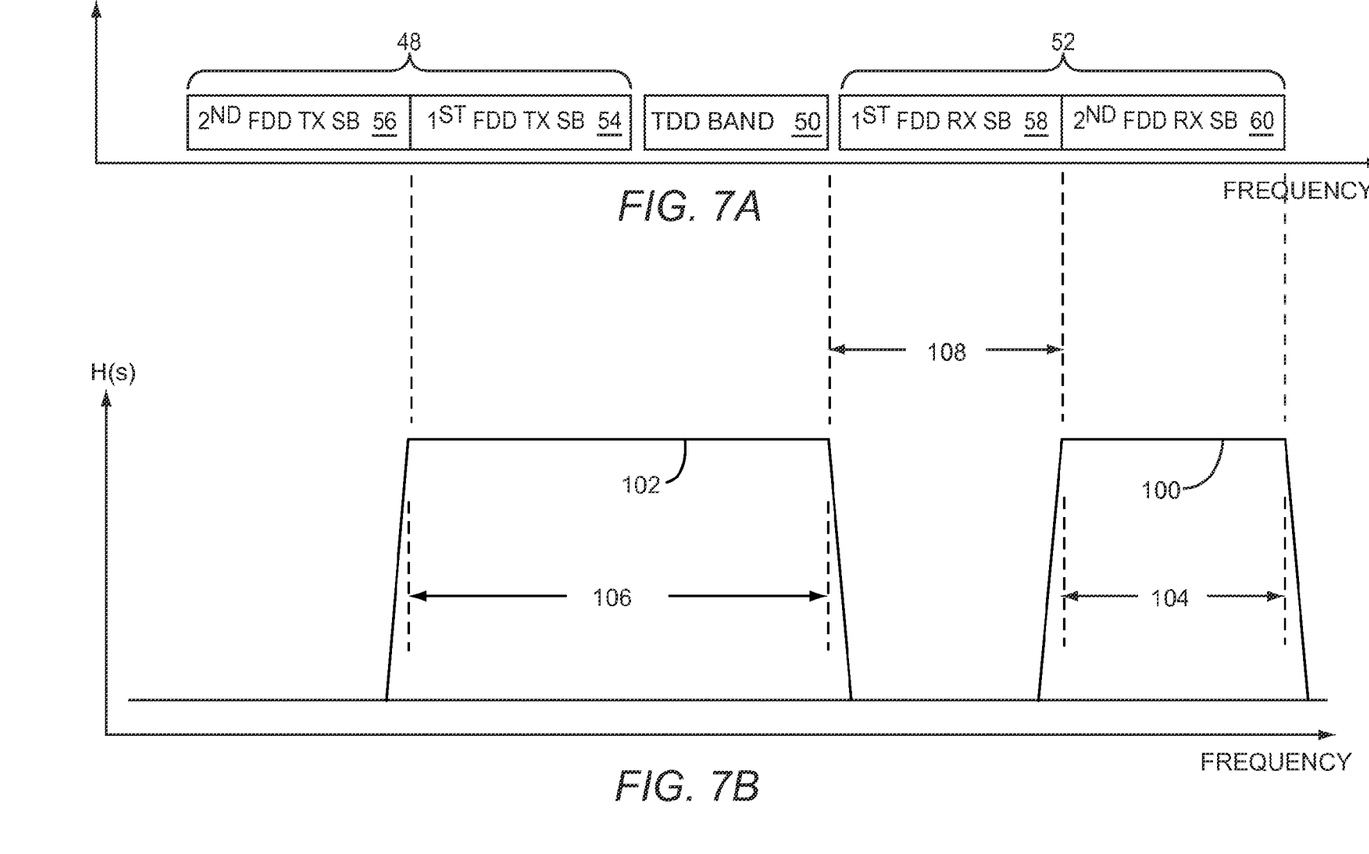
FIG. 7A is a duplicate of FIG. 5B and shows the first FDD transmit sub-band, the second FDD transmit sub-band, the first FDD receive sub-band, the second FDD receive sub-band, and the TDD band according to one embodiment of the RF circuitry.
FIG. 7B is a graph showing a first receive bandpass filter response curve and a first transmit bandpass filter response curve according to one embodiment of the RF circuitry.

FIG. 7A is a duplicate of FIG. 5B and shows the first FDD transmit sub-band 54, the second FDD transmit sub-band 56, the first FDD receive sub-band 58, the second FDD receive sub-band 60, and the TDD band 50 according to one embodiment of the RF circuitry 62.

FIG. 7B is a graph showing a first receive bandpass filter response curve 100 and a first transmit bandpass filter response curve 102 according to one embodiment of the RF circuitry 62. The first receive bandpass filter response curve 100 is associated with the first receive bandpass filter 70, which during the second FDD operating mode has a first receive passband 104.

Further, during the second FDD operating mode, the first filtered receive signal $RF_{FRX1}$ falls within the first receive passband 104. The first transmit bandpass filter response curve 102 is associated with the first transmit bandpass filter 72, which during the second FDD operating mode and during the TDD operating mode while transmitting has a first transmit passband 106. Further, during the second FDD operating mode and during the TDD operating mode while transmitting, the first filtered transmit signal $RF_{FTX1}$ falls within the first transmit passband 106. The first transmit passband 106 is separated from the first receive passband 104 by a band separation 108, which may be large enough to relax design constraints of the first receive bandpass filter 70 and the first transmit bandpass filter 72. During the TDD operating mode while transmitting, the first transmit passband 106 spans the first FDD transmit sub-band 54 and the TDD band 50.

Figure 8A:
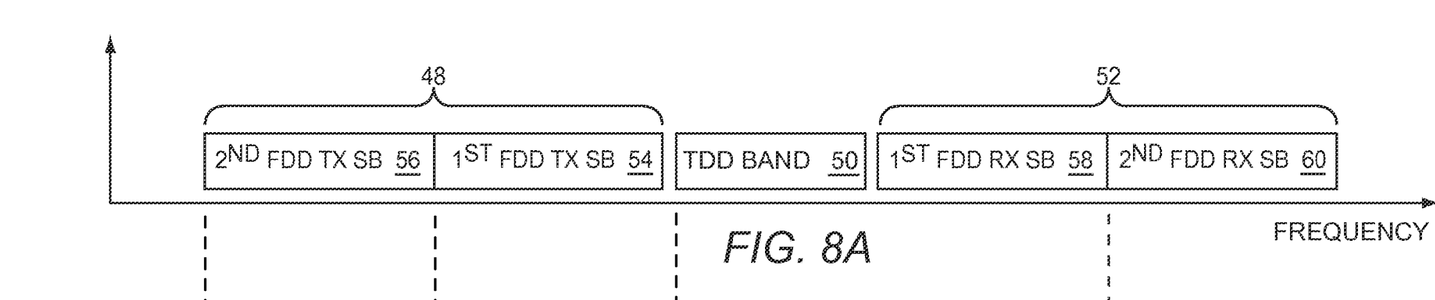
FIG. 8A is a duplicate of FIG. 5B and shows the first FDD transmit sub-band, the second FDD transmit sub-band, the first FDD receive sub-band, the second FDD receive sub-band, and the TDD band according to one embodiment of the RF circuitry.

FIG. 8A is a duplicate of FIG. 5B and shows the first FDD transmit sub-band 54, the second FDD transmit sub-band 56, the first FDD receive sub-band 58, the second FDD receive sub-band 60, and the TDD band 50 according to one embodiment of the RF circuitry 62.

Figure 8B:
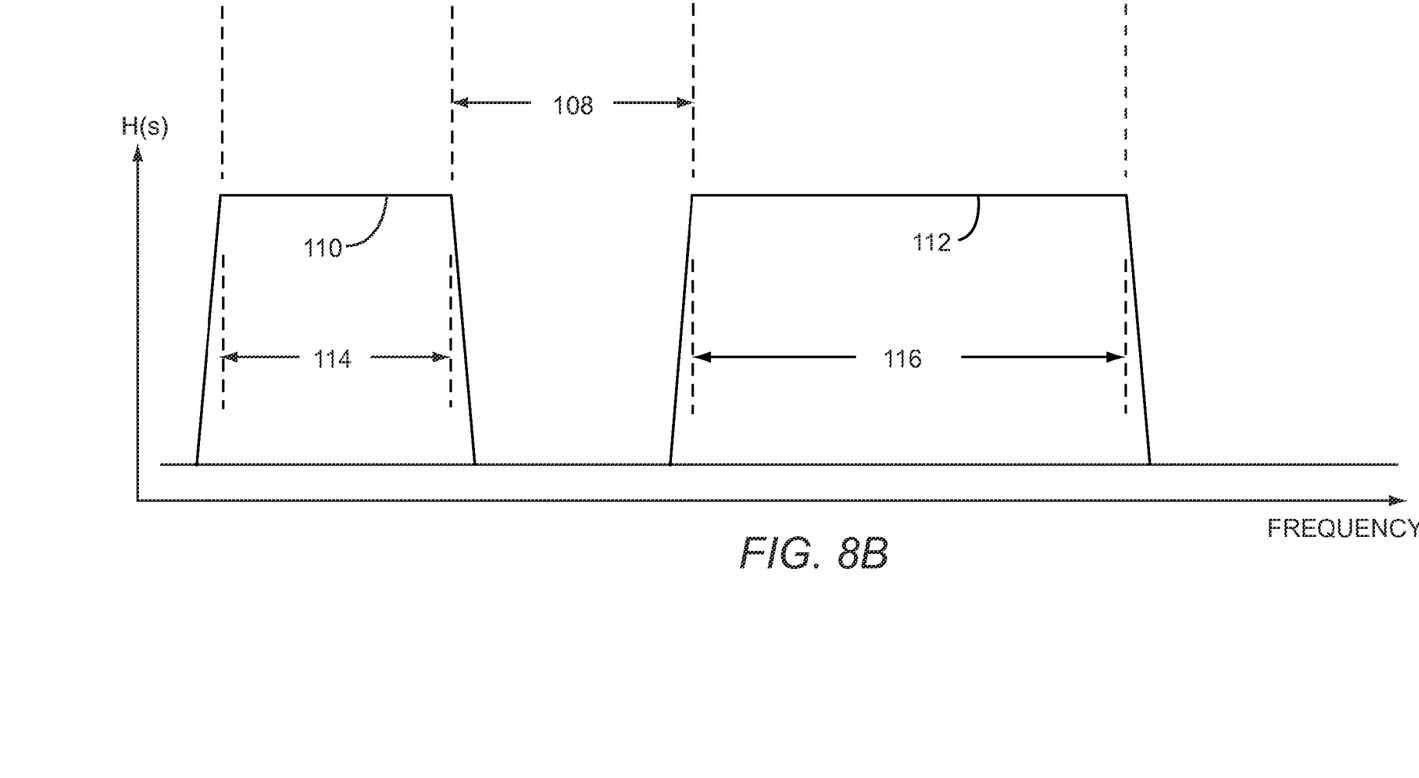
FIG. 8B is a graph showing a second transmit bandpass filter response curve and a second receive bandpass filter response curve according to one embodiment of the RF circuitry.

FIG. 8B is a graph showing a second transmit bandpass filter response curve 110 and a second receive bandpass filter response curve 112 according to one embodiment of the RF circuitry 62. The second transmit bandpass filter response curve 110 is associated with the second transmit bandpass filter 76, which during the first FDD operating mode has a second transmit passband 114. Further, during the first FDD operating mode, the second filtered transmit signal $RF_{FTX2}$ falls within the second transmit passband 114. The second receive bandpass filter response curve 112 is associated with the second receive bandpass filter 74, which during the first FDD operating mode and during the TDD operating mode while receiving has a second receive passband 116. Further, during the first FDD operating mode and during the TDD operating mode while receiving, the second filtered receive signal $RF_{FRX2}$ falls within the second receive passband 116. The second transmit passband 114 is separated from the second receive passband 116 by the band separation 108, which may be large enough to relax design constraints of the second receive bandpass filter 74 and the second transmit bandpass filter 76. During the TDD operating mode while receiving, the second receive passband 116 spans the first FDD receive sub-band 58 and the TDD band 50. A combination of the first transmit passband 106 and the second transmit passband 114 span the FDD transmit band 48, and a combination of the first receive passband 104 and the second receive passband 116 span the FDD receive band 52.

Figure 9A:
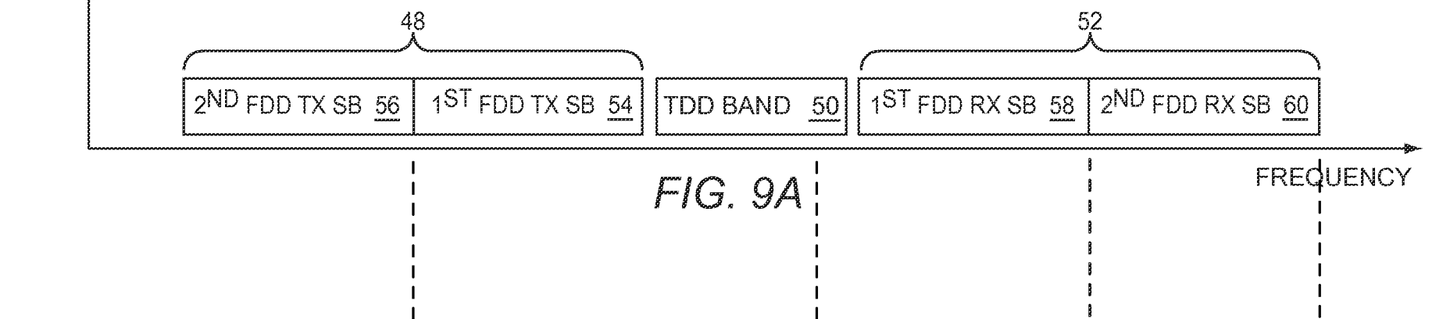
FIG. 9A is a duplicate of FIG. 5B and shows the first FDD transmit sub-band, the second FDD transmit sub-band, the first FDD receive sub-band, the second FDD receive sub-band, and the TDD band according to one embodiment of the RF circuitry.

FIG. 9A is a duplicate of FIG. 5B and shows the first FDD transmit sub-band 54, the second FDD transmit sub-band 56, the first FDD receive sub-band 58, the second FDD receive sub-band 60, and the TDD band 50 according to one embodiment of the RF circuitry 62.

Figure 9B:
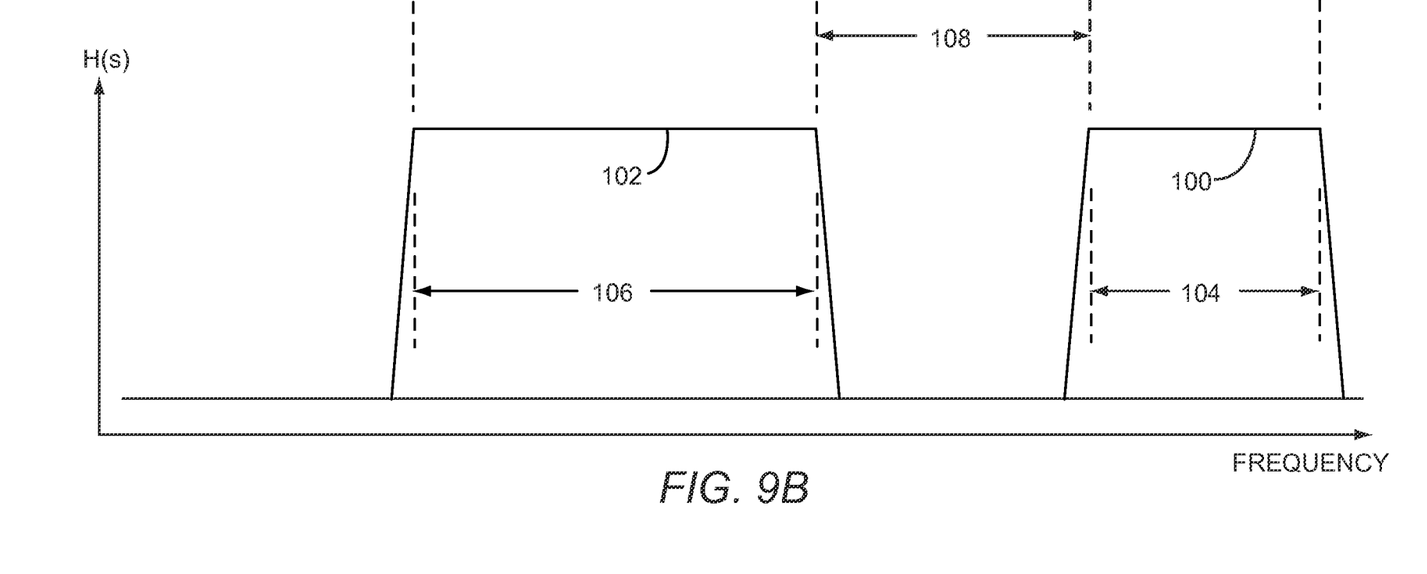
FIG. 9B is a graph showing the first receive bandpass filter response curve and the first transmit bandpass filter response curve according to an alternate embodiment of the RF circuitry.

FIG. 9B is a graph showing the first receive bandpass filter response curve 100 and the first transmit bandpass filter response curve 102 according to an alternate embodiment of the RF circuitry 62. In the RF circuitry 62 associated with FIG. 9B, the first transmit bandpass filter 72 is tunable. As such, the first transmit passband 106 is wider during the TDD operating mode while transmitting than the first transmit passband 106 is during the second FDD operating mode. The first transmit passband 106 illustrated in FIG. 7B shows the first transmit passband 106 during the TDD operating mode while transmitting, whereas the first transmit passband 106 illustrated in FIG. 9B shows the first transmit passband 106 during the second FDD operating mode. The first transmit passband 106 illustrated in FIG. 7B spans the TDD band 50, whereas the first transmit passband 106 illustrated in FIG. 9B does not span the TDD band 50, since frequencies in the TDD band 50 are not used during the second FDD operating mode. In this regard, the band separation 108 may be further increased during the second FDD operating mode, which may further relax design constraints of the first transmit bandpass filter 72.

Figure 10A:
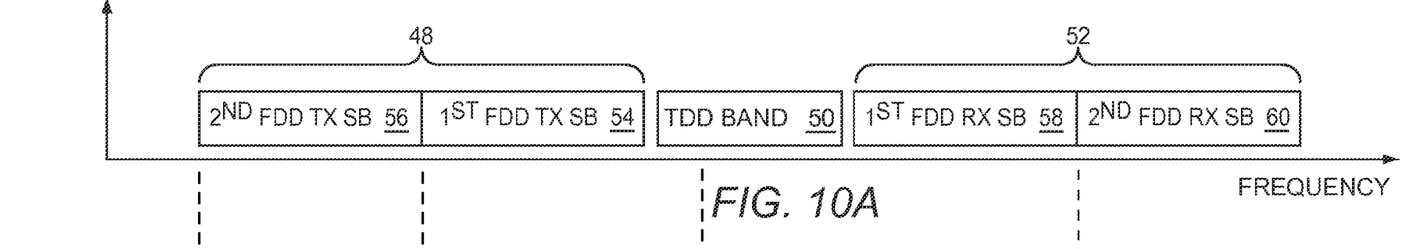
FIG. 10A is a duplicate of FIG. 5B and shows the first FDD transmit sub-band, the second FDD transmit sub-band, the first FDD receive sub-band, the second FDD receive sub-band, and the TDD band according to one embodiment of the RF circuitry.

FIG. 10A is a duplicate of FIG. 5B and shows the first FDD transmit sub-band 54, the second FDD transmit sub-band 56, the first FDD receive sub-band 58, the second FDD receive sub-band 60, and the TDD band 50 according to one embodiment of the RF circuitry 62.

Figure 10B:
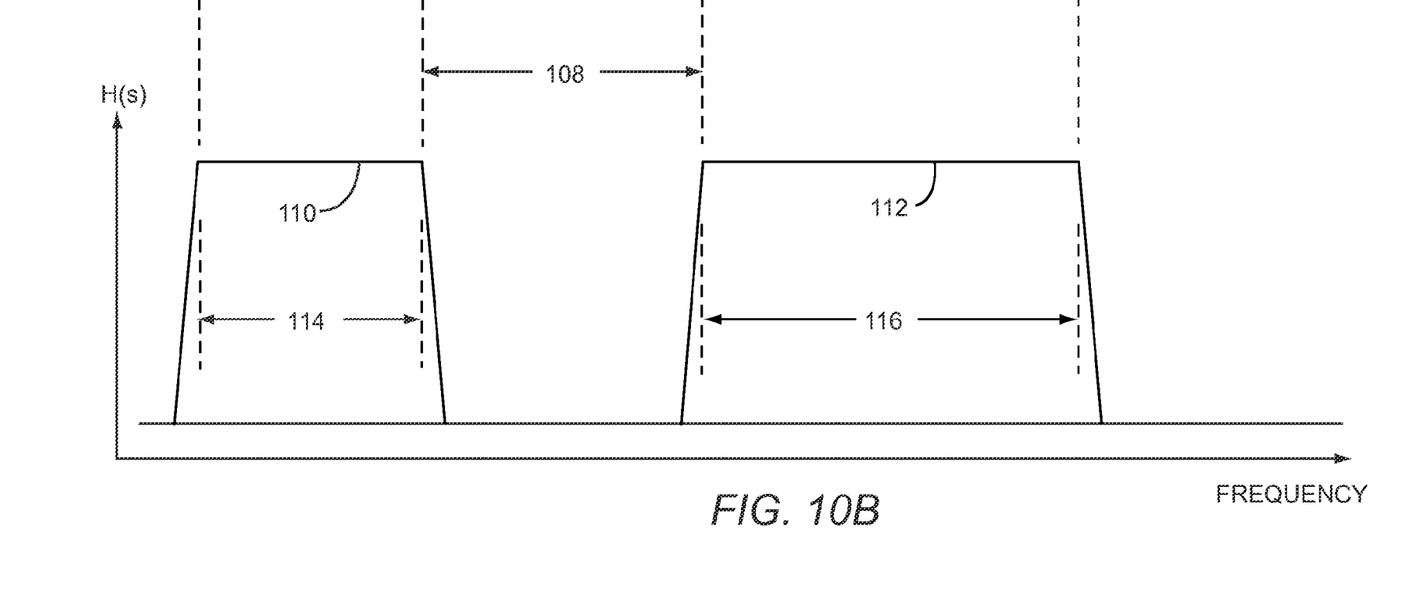
FIG. 10B is a graph showing the second transmit bandpass filter response curve and the second receive bandpass filter response curve according to an alternate embodiment of the RF circuitry.

FIG. 10B is a graph showing the second transmit bandpass filter response curve 110 and the second receive bandpass filter response curve 112 according to an alternate embodiment of the RF circuitry 62. In the RF circuitry 62 associated with FIG. 10B, the second receive bandpass filter 74 is tunable. As such, the second receive passband 116 is wider during the TDD operating mode while receiving than the second receive passband 116 is during the first FDD operating mode. The second receive passband 116 illustrated in FIG. 8B shows the second receive passband 116 during the TDD operating mode while receiving, whereas the second receive passband 116 illustrated in FIG. 10B shows the second receive passband 116 during the first FDD operating mode. The second receive passband 116 illustrated in FIG. 8B spans the TDD band 50, whereas the second receive passband 116 illustrated in FIG. 10B does not span the TDD band 50, since frequencies in the TDD band 50 are not used during the first FDD operating mode. In this regard, the band separation 108 may be further increased during the first FDD operating mode, which may further relax design constraints of the second receive bandpass filter 74.

Those skilled in the art will recognize improvements and modifications to the preferred embodiments of the present invention. All such improvements and modifications are considered within the scope of the concepts disclosed herein and the claims that follow.

What is claimed is:

1. Radio frequency (RF) circuitry comprising:
control circuitry adapted to select one of a plurality of operating modes, which comprise a first frequency division duplex (FDD) operating mode, a second FDD operating mode, and a time division duplex (TDD) operating mode;
a first sub-band duplexer adapted to:
during the TDD operating mode and during the second FDD operating mode, receive and filter a first transmit signal to provide a first filtered transmit signal, which falls within a first transmit passband of the first sub-band duplexer; and
during the second FDD operating mode, receive and filter a first receive signal to provide a first filtered receive signal, which falls within a first receive passband of the first sub-band duplexer; and
a second sub-band duplexer adapted to:
during the first FDD operating mode, receive and filter a second transmit signal to provide a second filtered transmit signal, which falls within a second transmit passband of the second sub-band duplexer, such that a combination of the first transmit passband and the second transmit passband span an FDD transmit band, and during the TDD operating mode while transmitting, the first transmit passband spans a TDD band; and
during the first FDD operating mode and during the TDD operating mode, receive and filter a second receive signal to provide a second filtered receive signal, which falls within a second receive passband of the second sub-band duplexer, such that a combination of the first receive passband and the second receive passband span an FDD receive band, and during the TDD operating mode while receiving, the second receive passband spans the TDD band, which falls between the FDD transmit band and the FDD receive band.

2. The RF circuitry of claim 1 wherein the TDD operating mode is a half-duplex operating mode and the first and the second FDD operating modes are full-duplex operating modes.

3. The RF circuitry of claim 1 wherein frequencies within the FDD transmit band are greater than frequencies within the FDD receive band and frequencies within the TDD band are between the frequencies within the FDD transmit band and the frequencies within the FDD receive band.

4. The RF circuitry of claim 1 wherein frequencies within the FDD transmit band are less than frequencies within the FDD receive band and frequencies within the TDD band are between the frequencies within the FDD transmit band and the frequencies within the FDD receive band.

5. The RF circuitry of claim 1 wherein the FDD transmit band includes a first FDD transmit sub-band and a second FDD transmit sub-band, and the FDD receive band includes a first FDD receive sub-band and a second FDD receive sub-band.

6. The RF circuitry of claim 5 wherein the first transmit passband spans the first FDD transmit sub-band and the TDD band, and the second receive passband spans the first FDD receive sub-band and the TDD band.

7. The RF circuitry of claim 5 wherein a bandwidth of the first FDD transmit sub-band is about equal to a bandwidth of the second FDD transmit sub-band, and a bandwidth of the first FDD receive sub-band is about equal to a bandwidth of the second FDD receive sub-band.

8. The RF circuitry of claim 1 wherein the first transmit passband is wider during the TDD operating mode than the first transmit passband is during the second FDD operating mode, and the second receive passband is wider during the TDD operating mode than the second receive passband is during the first FDD operating mode.

9. The RF circuitry of claim 1 wherein:
the first sub-band duplexer comprises:
a first transmit bandpass filter adapted to during the TDD operating mode and during the second FDD operating mode, receive and filter the first transmit signal to provide the first filtered transmit signal, such that the first transmit bandpass filter has the first transmit passband; and
a first receive bandpass filter adapted to during the second FDD operating mode, receive and filter the first receive signal to provide the first filtered receive signal, such that the first receive bandpass filter has the first receive passband; and
the second sub-band duplexer comprises:
a second transmit bandpass filter adapted to during the first FDD operating mode, receive and filter the second transmit signal to provide the second filtered transmit signal, such that the second transmit bandpass filter has the second transmit passband; and
a second receive bandpass filter adapted to during the first FDD operating mode and during the TDD operating mode, receive and filter the second receive signal to provide the second filtered receive signal, such that the second receive bandpass filter has the second receive passband.

10. The RF circuitry of claim 9 wherein the first transmit bandpass filter and the second receive bandpass filter are tunable.

11. The RF circuitry of claim 10 wherein the first transmit passband is wider during the TDD operating mode than the first transmit passband is during the second FDD operating mode, and the second receive passband is wider during the TDD operating mode than the second receive passband is during the first FDD operating mode.

12. The RF circuitry of claim 9 wherein at least one of the first transmit bandpass filter, the second transmit bandpass filter, the first receive bandpass filter, and the second receive bandpass filter comprises at least one surface acoustic wave (SAW) filter.

13. The RF circuitry of claim 9 further comprising antenna switching circuitry:
coupled between the first transmit bandpass filter and an antenna, and adapted to:
during the TDD operating mode while transmitting and during the second FDD operating mode, electrically couple the first transmit bandpass filter to the antenna; and
during the TDD operating mode while receiving and during the first FDD operating mode, electrically isolate the first transmit bandpass filter from the antenna;
coupled between the first receive bandpass filter and the antenna, and adapted to:
during second FDD operating mode, electrically couple the first receive bandpass filter to the antenna; and
during the first FDD operating mode, electrically isolate the first receive bandpass filter from the antenna;
coupled between the second transmit bandpass filter and the antenna, and adapted to:
during first FDD operating mode, electrically couple the second transmit bandpass filter to the antenna; and
during the second FDD operating mode, electrically isolate the second transmit bandpass filter from the antenna; and
coupled between the second receive bandpass filter and the antenna, and adapted to:
during the TDD operating mode while receiving and during the first FDD operating mode, electrically couple the second receive bandpass filter to the antenna; and
during the TDD operating mode while transmitting and during the second FDD operating mode, electrically isolate the second receive bandpass filter from the antenna.

14. The RF circuitry of claim 13 wherein the antenna switching circuitry comprises at least one Micro-Electro-Mechanical Systems (MEMS) switch.

15. The RF circuitry of claim 13 further comprising RF power amplifier circuitry adapted to:
during the TDD operating mode while transmitting and during the second FDD operating mode, provide the first transmit signal; and
during the first FDD operating mode, provide the second transmit signal.

16. The RF circuitry of claim 15 further comprising transmit switching circuitry:
coupled between the first transmit bandpass filter and the RF power amplifier circuitry, and adapted to:
during the TDD operating mode while transmitting and during the second FDD operating mode, electrically couple the first transmit bandpass filter to the RF power amplifier circuitry; and during the first FDD operating mode, electrically isolate the first transmit bandpass filter from the RF power amplifier circuitry; and coupled between the second transmit bandpass filter and the RF power amplifier circuitry, and adapted to:

during first FDD operating mode, electrically couple the second transmit bandpass filter to the RF power amplifier circuitry; and during the second FDD operating mode, electrically isolate the second transmit bandpass filter from the RF power amplifier circuitry.

17. The RF circuitry of claim 16 wherein the transmit switching circuitry comprises at least one Micro-Electro-Mechanical Systems (MEMS) switch.

18. The RF circuitry of claim 15 further comprising RF receive circuitry adapted to:

during the second FDD operating mode, receive the first filtered receive signal; and during the first FDD operating mode and during the TDD operating mode while receiving, receive the second filtered receive signal.

19. A method comprising:

selecting one of a plurality of operating modes, which comprise a first frequency division duplex (FDD) operating mode, a second FDD operating mode, and a time division duplex (TDD) operating mode;

providing a first sub-band duplexer and second sub-band duplexer;

during the TDD operating mode and during the second FDD operating mode, receiving and filtering a first transmit signal to provide a first filtered transmit signal, which falls within a first transmit passband of the first sub-band duplexer;

during the second FDD operating mode, receiving and filtering a first receive signal to provide a first filtered receive signal, which falls within a first receive passband of the first sub-band duplexer;

during the first FDD operating mode, receiving and filtering a second transmit signal to provide a second filtered transmit signal, which falls within a second transmit passband of the second sub-band duplexer, such that a combination of the first transmit passband and the second transmit passband span an FDD transmit band, and during the TDD operating mode while transmitting, the first transmit passband spans a TDD band; and during the first FDD operating mode and during the TDD operating mode, receiving and filtering a second receive signal to provide a second filtered receive signal, which falls within a second receive passband of the second sub-band duplexer, such that a combination of the first receive passband and the second receive passband span an FDD receive band, and during the TDD operating mode while receiving, the second receive band spans the TDD band, which falls between the FDD transmit band and the FDD receive band.

20. The RF circuitry of claim 19 wherein the TDD operating mode is a half-duplex operating mode and the first and the second FDD operating modes are full-duplex operating modes.

* * * * *